3,440,259
POLYOL COMPOSITION FOR PREPARING URETHANE PLASTICS

Janis A. Bungs, Willoughby, Ohio, assignor to Diamond Shamrock Corporation, a corporation of Delaware
No Drawing. Filed Nov. 18, 1965, Ser. No. 508,560
Int. Cl. C07f 9/90; C08g 22/40, 22/44
U.S. Cl. 260—446          9 Claims

ABSTRACT OF THE DISCLOSURE

A polyol composition is described which comprises a condensation reaction product of from 1 to 2 mols of a halogenated aldehyde having from 2 to 5 carbons, inclusive, per molecule, 1 mol of at least one branch-chain polyether polyol having a minimum of two hydroxyl groups per molecule and from 0.08 to 0.10 mol of antimony trioxide, said reactants being subjected to a reaction temperature of 100° to 225° C. for a period of from 1 to 20 hours. Use of the polyol composition to prepare polyurethane plastics is also described.

---

This invention relates to flame-resistant urethane plastics. More particularly, it relates to a novel polyol composition having chemically incorporated therein both halogen and antimony as flame-retarding agents, the said antimony also acting as a catalyst for the urethane reaction, and to the use of this composition in the preparation of flame-resistant urethane plastics.

It is well known in the art to prepare urethane plastic materials by reacting polyhydroxy compounds with polyisocyanates. Depending upon the manner in which they are prepared, these polyurethanes may be in the form of either cellular or non-cellular products which vary widely from extremely soft resinous materials to hard rigid articles. Because of their excellent physical and chemical properties, urethane plastics have enjoyed ever-increasing use in industry. Cellular polyurethanes, for example, exhibiting low density coupled with excellent tensile strength, find large-scale application as cushioning materials and as insulation against the transmission of heat, sound and moisture. Non-cellular polyurethanes are especially useful as adhesives, as protective coatings and laminates and for application in the preparation of various castings and moldings.

However, most conventional polyurethanes are flammable materials, i.e., they will burn rapidly and freely when contacted with a flame. Consequently, their use has largely been precluded in applications where safety and non-flammability are of prime importance such as, for example, the use of the cellular products as insulation materials in various types of construction or in electrical equipment.

In the present invention, new and novel compositions have been prepared for use in the production of flame-retardant polyurethanes, particularly the cellular materials commonly designated in the art as "foams." In the prior art, attempts to produce flame-retardant polyurethanes have comprised blending into the basic foam formulation either one or more organic or inorganic compounds as flame-proofing agents. For example, an antimony compound such as antimony trioxide has long been employed to impart flame-resistance to urethane foams, being usually dispersed in the formulation in a finely-divided state. Being significantly higher in density than the foam mixture, however, and not being compatible therewith, the antimony compound settles out of suspension upon storage and must again be dispersed in the mixture prior to foaming operations. Antimony compounds so added to the foam formulation are found to adversely affect the properties of the foam products. Likewise, polyhalogen compounds if not chemically bound to the polyurethane structure, will adversely affect foam properties.

Foam products having more permanent flame-resistant properties recently have been produced by using as the polyhydroxy component of the foam formulation a halogen-containing polyester or a halogen-containing polyester-polyether mixture. However, such foam components being usually very viscous liquids are oftentimes difficult to handle during foaming operations.

It can likewise be envisioned that non-cellular urethane plastics, e.g., coatings, adhesives, laminates, castings, moldings and the like would similarly enjoy wider commercial use if they could be made permanently flame-resistant at no sacrifice to their excellent properties and performance.

It is an object of this invention, therefore, to provide for use in the preparation of urethane plastics a polyhydroxy compound containing along with a percentage of halogen, i.e., chlorine, fluorine or bromine, a percentage of antimony sufficient to impart flame-resistant character to the products prepared therefrom.

Another object of this invention is to provide an improved process for incorporating antimony in a urethane plastic.

A further object of this invention is to provide for use in the preparation of flame-retardant polyurethanes an antimony-containing polyhydroxy compound in which the antimony serves as a catalyst for the urethane reaction.

A still further object of this invention is to provide rigid to flexible cellular urethane products having permanent flame-resistant characteristics.

Still another object of this invention is to provide flame-resistant, non-cellular urethane plastics such as coatings, laminates, castings, moldings and the like.

These and other objects of the invention will become apparent to those skilled in the art from the following description. A halogen and antimony-containing composition reactive with polyisocyanates is prepared by reacting at an elevated temperature a halogenated aldehyde, a compound having at least two and preferably three hydroxyl groups per molecule and either an organic or inorganic compound containing trivalent antimony. The reaction is carried out with heat and agitation until the antimony has been chemically incorporated into the reaction mixture, as evidenced either by solubilization of the antimony compound if initially insoluble therein or by the recovery of identifiable secondary reaction products from the reaction of a soluble antimony material. Thereafter, depending upon the type of urethane plastic being prepared, the halogen and antimony-containing polyol product may be mixed with a polyisocyanate and other components, as necessary, to prepare the flame-resistant polyurethanes desired.

The halogenated aldehydes which suitably may be employed to prepare the flame-resistant polyol composition of this invention are those containing from 2 to 5 carbon atoms, inclusive, per molecule, i.e., acetaldehyde, propionaldehyde, butyraldehyde, valeraldehyde and isomers thereof. These aldehydes contain at least one and preferably at least three of either chlorine, fluorine or bromine substituents. Specific useful halogenated aldehydes include the mono-, di- and trichloroacetaldehydes and their fluorinated and brominated analogs; the mono-, di-, and trichloropropionaldehydes and their fluorinated and brominated analogs; the mono-, di-, tri- and perchloro n-butyraldehydes and their fluorinated and brominated analogs; the chlorinated, fluorinated and brominated isobutyraldehydes, etc. Of these compounds, trichloroacetaldehyde, which is more commonly designated in the art as chloral, is presently preferred for use because of its reeady availability and low cost. For these reasons, therefore, specific reference will be made hereinafter to the use of chloral, and accordingly to a chlorine and antimony-containing polyol composition. Such specific references are not to be taken as limiting the present invention, however, but merely as being illustrative thereof.

Organic trivalent antimony compounds which suitably may be used herein include antimonyl derivatives of metallic salts of aliphatic, alpha-hydroxy, mono- and polybasic organic acids, e.g., potassium antimonyl tartrate, potassium antimonyl mucate, potassium antimonyl lactate, potassium antimonyl citrate, lithium antimonyl tartrate, barium antimonyl tartrate and the like. Also, suitable for use are the esters of antimonous acid prepared by reacting an epoxide or an ogranic hydroxy compound with antimony trichloride or antimony trioxide such as, for example, tris(2-chloroethyl)antimonite, tris(2-chloropropyl)antimonite, tris(2-chlorobutyl)antimonite, tris(2-ethylhexyl)antimonite, triphenyl antimonite, etc. Such organic trivalent antimony compounds may or may not be soluble initially in the reaction mixture. The inorganic trivalent antimony compounds typically employed herein include antimony trioxide and antimony trisulfide, with the trioxide presently being preferred for use.

The novel polyol composition obtained according to this invention, which composition is a mixture of condensation products and is recovered from the reaction substantially in quantitative yield, is the result of both simultaneous and subsequent reactions effected between the halogenated aldehyde, e.g., chloral, and the hydroxyl and antimony-containing components employed. It is believed that the halogenated aldehyde and the polyhydroxy component react initially to form aldehyde hemiacetals of the polyhydroxy compound. Since the polyhydroxy compound, i.e., polyol, is polyfunctional, the aldehyde, e.g., chloral may react with one or more functional groups of the same polyol molecule, yielding various isomeric mono- and polychloral hemiacetals thereof. Subsequent reaction of the antimony compound with the aldehyde hemiacetals thus formed yields antimonites of these hemiacetals. Depending upon the amount of antimony compound employed, the reaction product may be a mixture containing the various isomeric mono- and polyaldehyde hemiacetals as well as the antimonites of these compounds. It likewise should be recognized that if an excess quantity of the polyol is employed in proportion to the halogenated aldehyde, antimonites of the polyol may also be formed and be present in the reaction product.

During the reaction, suspended solids in the reaction mixture, such as initially-insoluble antimony compounds are observed to gradually disappear so that a homogeneous syrupy product is obtained. It is believed that the initially-insoluble antimony compounds are converted into organic or inorganic antimony compounds which are soluble or miscible with the other condensation products formed. It should be noted, however, that an insoluble antimony compound such as antimony trioxide will not react favorably with either the halogenated aldehyde or with the hydroxy-containing compound under similar reaction conditions. For example, no soluble antimony compounds are formed when separate suspensions of antimony trioxide in chloral and in the hydroxyl-containing compound are each subjected to the same reaction conditions as are employed to prepare the polyol composition of this invention. When such mixtures are allowed to stand after treatment, the antimony trioxide is observed to settle out of suspension.

As recovered, the polyol composition of this invention is a homogeneous syrupy liquid at room temperature which can be easily poured. It is completely soluble in halogenated alkane solvents of the type which are used as foaming agents in the preparation of polyurethane cellular products. No solids are observed to precipitate from the composition upon standing, indicating that no insoluble auxiliary products are formed during preparation of the composition nor during subsequent storage.

In preparing the flame-resistant polyurethane products of this invention, the polyol composition can be reacted easily with the polyisocyanates in the absence of catalysts generally used to initiate the polyol-polyisocyanate crosslinking reaction. The antimony contained in the polyol acts as a catalyst for the reaction. It will easily be recognized by those skilled in the art that the speed of the urethane reaction may be varied depending upon the amount of antimony present in the polyol composition.

Depending primarily on the type and quantity of polyhydroxy compound employed, the quantity of antimony compound employed and the conditions of the reaction, the polyol composition of this invention generally has a hydroxyl number ranging from about 25 up to 600, a halogen, e.g., chlorine content ranging from about 2% up to about 40% by weight, and an antimony content ranging from about 0.1% up to about 12% by weight. The presently preferred polyol of this invention contains by weight from about 5% up to 25% halogen, e.g., chlorine and from 0.3% up to about 10% antimony. It should be easily recognized that the aforementioned reaction components, and especially the polyhydroxy component, will naturally be varied depending upon the particular end-use to which the polyol composition is applied.

The hydroxyl-containing compounds, i.e., polyols employed herein are monomeric and polymeric compounds having at least two functional hydroxyl groups per molecule. Such compounds generally include polyalcohols, polyethers and hydroxyl-containing polyesters, with the polyethers presently being preferred for use. Suitable polyether polyols may be either branch chain or linear polyether polyols or mixtures thereof which have at least one, and preferably, a plurality of ether linkages and contain at least two functional hydroxyl groups. Branch-chain polyether polyols containing at least three and preferably up to at least eight hydroxyl groups include such compounds as the reaction products of alkylene oxides, such as propylene oxide, butylene oxide, mixtures of ethylene and propylene oxide, etc. with polyhydric compounds such as glycerol; trimethylol propane; butanetriols; hexanetriols; tetrols, such as pentaerythritol; pentols; hexols such as sorbital; sucrose; glycosides such as lower alkyl arabinosides, exloside, fructoside, glucoside, rhammoside and the like. Similarly, linear or substantially linear polyether polyols are obtained by polyaddition reaction, i.e., polymerization, copolymerization, etc. of alkylene oxides or mixtures thereof with, for example, water or with alkylene or dialkylene glycols or heterocyclic ethers, either singly or in combination. In preparing the polyol composition of this invention, the various polyhydric materials listed above may be combined with the polyether polyols as well as mixtures of the polyols themselves.

Polyester polyols which may be employed are prepared by reacting at least two bifunctional ingredients such as a glycol and a dibasic acid.

In practice, the particular polyol or polyol mixture employed in combination with the halogenated aldehyde, as chloral to prepare the polyol composition of this invention will vary widely in average molecular weight and functionally, depending upon the end-use of the composition. For use in preparing rigid polyurethane foams, for example, a suitable polyol composition generally has a hydroxyl number of from 250 to 600 and has at least three and preferably more than three functional groups per molecule. A polyol composition suitable for rigid foam preparation may, of course, also comprise a mixture of such a polymeric polyol with either monomeric polyhydric compounds having at least two functional hydroxyl groups and/or with other similar polyols. For the preparation of semi-rigid and flexible foam products, however, the polyol composition typically has less functionality, is of higher molecular weight and has a hydroxyl number ranging from 25 to 250.

In preparing the composition, the quantity of halogenated aldehyde, i.e., chloral used in proportion to the hydroxyl-containing component will be varied depending upon the end-use to which the polyol composition is applied. Specifically, in preparing a polyol for use in rigid urethane foam production, a ratio of from about 1 to 2 moles of chloral per mole of polyol or polyol mixture generally has been found satisfactory and is presently preferred for use.

The quantity of antimony incorporated into the reaction may vary depending upon the flame-resistant properties desired in the polyurethane products. For example, an amount of antimony compound sufficient to provide up to 0.1 mole of antimony per mole of the polyol component generally has been found sufficient to impart, in combination with the incorporated chlorine, excellent flame-retardant characteristics to the polyol composition and to the plastic products prepared therefrom. It is to be noted that varying the quantity of antimony in the polyol composition serves to modify the catalytic activity of the composition in the urethane reaction.

As previously described hereinabove, the polyol composition of this invention is prepared at an elevated temperature by reacting a mixture containing a halogenated aldehyde, e.g., chloral, a hydroxyl-containing component and a trivalent antimony compound. If an initially insoluble antimony compound, such as antimony trioxide, is employed, the reaction is conducted until the original cloudy or milky reaction mixture converts to a substantially homogeneous, fluid substance, indicating that the antimony has chemically combined. Alternatively, when a soluble antimony compound, e.g., an organic antimonite, is used, volatile secondary condensation products may be recovered and identified to indicate that the antimony has been chemically combined. In each instance, the reaction generally may be conducted at a temperature of 100° to 225° C. for a time period of from 2 to 20 hours. However, the reaction is preferably conducted for 2 to 14 hours at a temperature of 120° to 180° C.

As stated previously, the polyol composition of this invention is reacted with a polyisocyanate to prepare the polyurethane product, other ingredients being added to the basic formulation as necessary depending upon the particular products desired. The polyol and polyisocyanate are reacted in the presence of a foaming or blowing agent and usually in the presence of a foam stibilized. Other ingredients which may be used include organic and inorganic fillers, color pigments, dyes, antioxidants and the like.

Polyisocyanates suitable for use herein include any of the polyisocyanates commercially available at the present time which have two, three or more reactive isocyanate groups. Examples of suitable polyisocyanates which may be either aliphatic or aromatic compounds include tetra- and hexamethylene diisocyanates, arylene diisocyanates and their alkylation products such as the phenylene diisocyanates, naphthylene diisocyanates, diphenyl methane diisocyanates, toluene diisocyanates, di- and triisopropylbenzene diisocyanates and triphenyl methane triisocyanate; aralkyl diisocyanates such as 1-(isocyanatophenyl)-ethyl isocyanate or the xylylene diisocyanates, Specific polyisocyanates particularly preferred for use include polymethylene polyphenylisocyanate, toluene diisocyanate (usually available as mixed 2,4- and 2,6-isomers), crude diphenylmethane-4,4'-diisocyanate, 3,3'-dimethoxy-4,4'-diphenylene diisocyanate and 1,5-naphthyl diisocyanate.

In preparing foam materials, the polyisocyanate compound generally is used in an excessive amount with respect to the polyol component, i.e., in an amount contributing generally from 1.00 to 2.00 isocyanate equivalents and preferably from 1.00 to 1.20 isocyanate equivalents for each hydroxyl equivalent of the polyol. In foam formulations, the treated polyol composition of this invention may be employed singly or it may be advantageous, in some instances, to also employ therewith a polyhydric compound so as to provide additional hydroxyl groups for cross-linking with isocyanate groups. Suitable polyhydric components are, for example, monomeric diols, triols and polyols such as are listed hereinbefore.

Any suitable foaming or blowing agent may be incorporated in a polyol-polyisocyanate mixture to prepare the foam products of this invention, e.g., water and organic liquid compounds which vaporize at or substantially below the temperature of the foaming reaction. Volatile organic compounds typically used are the lower molecular weight alkanes and alkenes, halogen-substituted lower molecular weight alkanes and lower molecular weight dialkyl ethers. Foaming or blowing agents generally are incorporated in the foam formulation in amounts ranging between 15% and 35%, by weight of the polyol component.

A surfactant or foam stabilizer is usually incorporated in foam formulations to aid in the development of fine cell structure and uniform density and also to keep the said cell structure from disintegrating before curing. Suitable surfactants include salts of long-chain fatty acids; salts of sulfates or sulfonates of high molecular weight organic compounds; the reaction products of ethylene oxide with a long-chain alcohol, an acid, an amine, or an alkylphenol; and liquid polydialkylsiloxanes and polysiloxane-polyalkylene oxide block copolymers. Chlorinated aliphatic hydrocarbons may, in some instances, also be used as economical auxiliary foam stabilizers.

In foaming operations as practiced heretofore, a catalyst such as an organic tin compound, a tertiary amine or other similar type compound well known in the art generally have been required in foam formulations in the reaction between the hydroxyl and polyisocyanate components. Of particular advantage in the practice of the present invention is that it is not necessary, in most instances, to employ catalysts in the foam formulation to initiate the urethane reaction. In addition to its significant flame-retarding activity, the polyol composition of this invention likewise serves as an efficient reaction catalyst and desirable foam products are quickly prepared from an otherwise catalyst-free foam formulation in which it is incorporated. However, conventional reaction catalysts such as described above may be used in the process so as to modify the foam reaction, if desired.

The foam products of this invention may be prepared either continuously or by a batch process. In the foaming process, as the exothermic reaction between the polyol and the polyisocyanate progresses, sufficient heat is evolved to volatilize the blowing agent and expand the reaction mixture. Depending upon the foaming technique employed, the foam mixture is then allowed to expand in place or is poured onto a conveyor or into suitable molds where expansion and curing of the cellular product is completed. Depending upon the particular foam formulation employed and the quantity of antimony incorporated therein, which antimony serves as a catalyst for the urethane reaction, the times required to convert the foam mixture into the fully expanded foam product may vary appreciably as, for example, in a time period varying from about 20 seconds up to about 10 minutes. Thereafter the expanded foam material is typically air cured for about 30 minutes before it is stored or used.

When large foam masses such as those produced for slab stock applications are prepared from the polyol composition of this invention, such foam products are oftentimes observed to be scorched or discolored in or towards the center sections thereof, indicating degradation of the foam. This degradation is believed to be due primarily to the exothermic heat of the urethane reaction which is dissipated slowly from within the foam mass because of the excellent insulating properties of the foam. Accordingly, it has been found advantageous, in most instances, to treat the polyol composition prior to use in preparing large foam masses with a minor amount of a compound having at least one epoxide group in its structure, according to the method described in copending application Ser. No. 449,324, filed Apr. 19, 1965. Epoxide materials suitable for use include alkylene oxides, e.g., propylene oxide, epichlorohydrin, or epoxy resins having an epoxy value of at least 0.10 per hundred grams of resin. Foam products subsequently obtained from the polyols so treated exhibit substantially improved heat stability with no noticeable discoloration in cross-section.

It is to be noted that the foam times of formulations incorporating therein a polyol composition of this invention which has been treated with an epoxide group-containing material, as described above, are in most instances markedly increased over those of similar formulations employing an untreated polyol. By "foam times," as used herein, is meant the time elapsing between the beginning of foaming until the foam mass has expanded to maximum height. It can easily be recognized that the foam times of formulations containing the treated polyol can be accelerated as desired by incorporating therein a minor amount of a conventional urethane catalyst such as described previously. Also, the foam times of these formulations may be modified by incorporating therewith varying quantities of the flame-resistant polyol composition described in copending application Ser. No. 436,315, filed Mar. 1, 1965, which polyol likewise contains chemically-combined chlorine and antimony. When used to modify the foam times of formulations containing a polyol composition of this invention which has been treated with an epoxide group-containing compound, the polyol of Ser. No. 436,315 preferably has also previously been treated with an epoxide group-containing compound.

The flame-resistant urethane foam products of this invention are thermosetting, cellular materials of varying density. They possess good dimensional stability, low thermal conductivity and excellent resistance to water absorption and to chemical attack. They are permanently flame-resistant materials as determined by standard test procedures. These foams are particularly useful as insulators against the transmission of heat, sound or moisture in various types of construction, electrical equipment and appliances, etc. and as packing insulation against vibration and mechanical shock. Materials of this type have gained wide acceptance in industry.

In addition to cellular polyurethane products, the polyol composition of this invention may also be advantageously employed to prepare other polyurethane products such as coatings, moldings or laminates which exhibit permanent flame-resistant characteristics.

In order that those skilled in the art may better understand the present invention and the preferred methods by which it may be practiced, the following specific examples are offered. In these examples and elsewhere herein, where proportions of ingredients are expressed in parts, such proportions are by weight.

EXAMPLE 1

Part A—Preparation of a chlorine and antimony-containing polyol composition

Into a one-liter, three-necked, round-bottomed flask, equipped with a thermometer, a dropping funnel, a mechanical stirrer, a water trap fitted to a reflux condenser, a heating mantle and nitrogen inlet and outlet tubes, are charged 690 g. (1 mol) of an oxypropylated sorbitol having an hydroxyl number of 490 and 23.4 g. (0.08 mol) of antimony trioxide. These reactants are blended together with agitation, while allowing a fine nitrogen stream to pass through the flask. While agitation and nitrogen purging are continued, 205.8 g. (1.4 mol) of chloral is added dropwise to the reaction suspension. The chloral addition is completed in one hour. The suspension is then externally heated and the reaction is continued for about 12 hours, during which time period the antimony trioxide dissolves and a brown, clear liquid is formed. The maximum temperature of the reaction mixture is 160° C. After cooling, the reaction product is poured into a suitable container. This product which is recovered in 94% yield has an hydroxyl number of 393, as determined by the method outlined in Siggia, S. "Quantitative Organic Analysis via Functional Groups," 2nd edition, Wiley and Sons, Inc., p. 9 (1958). The product has a viscosity of 51,000 c.p.s. as measured at 25° C. with a Brookfield Viscometer, RV Model. It contains 14.4 percent combined chlorine and 2.2 percent antimony, by weight.

Part B—Production of rigid urethane foam

A formulation is prepared, employing 100 parts of the polyol product of Part A above, 2.5 parts of L-5310 silicone oil (marketed by Union Carbide) and 28 parts of trichlorofluoromethane blowing agent. These ingredients are blended together at room temperature until a homogeneous solution is obtained. Ninety-seven parts of crude diphenylmethane 4,4'-diisocyanate (such as Mondur MR manufactured by Mobay Chemical) is then added and rapidly mixed into this solution. The foam mixture is poured into a suitable mold wherein expansion of the mixture is effected in about 108 seconds. The finished foam has a density of 1.76 pounds per cubic foot with a uniformly fine closed-cell structure throughout. Tested for flame-resistance in accordance with ASTM D1692–59T, the foam is classified as non-burning.

EXAMPLE 2

Following the general procedure as outlined in Part A of Example 1, a polyol is prepared employing 276.0 g. (0.4 mol) of an oxypropylated sorbitol having an hydroxyl number of 490, 318.0 g. (0.6 mol) of an oxypropylated sorbitol having an hydroxyl number of 650, 205.8 g. (1.4 mol) of chloral and 23.4 g. (0.08 mol) of antimony trioxide. After the addition of the chloral is complete, the reaction mixture is heated to a temperature of 158° to 160° C. and maintained at this temperature for 12 hours. The syrupy liquid polyol product obtained in about 95% yield has an hydroxyl number of 457 and contains, by weight, 15.5 percent chlorine and 2.5 percent antimony.

The procedure as outlined in Part B of Example 1 is followed to prepare a rigid urethane foam. One-hundred parts of the polyol product of this example, 2.5 parts of L-5310 silicone oil and 28 parts of trichlorofluoromethane are blended together to form a homogeneous solution. Into this solution is blended 113 parts of crude, diphenylmethane 4,4'-diisocyanate. The foam mixture is poured into a mold and expands to maximum height in 121 seconds. The finished foam is of uniformly fine closed-cell structure and has a density of 1.90 pounds per cubic foot. It is non-burning when tested in accordance with the ASTM D1692 flammability test.

EXAMPLE 3

A polyol is prepared as described in the previous examples, employing 530 g. (1 mol) of an oxypropylated sorbitol with an hydroxyl number of 650, 205.8 g. (1.4 mol) of chloral and 23.4 g. (0.08 mol) of antimony trioxide. After addition of the chloral is complete, the reaction mixture is heated to about 160° C. and maintained at this temperature for about 10 hours. The fluid polyol product recovered has an hydroxyl number of 473 and contains, by weight, 17.1 percent chlorine and 2.7 percent antimony.

To prepare a foam, 100 parts of the polyol product is mixed with 2.5 parts of L-5310 silicone oil and 31 parts of trichlorofluoromethane. One-hundred-seventeen parts of crude diphenylmethane 4,4'-diisocyanate is then blended into the resulting solution and the foam mixture prepared expands to its maximum height in 117 seconds. The uniformly fine, closed-cell foam product obtained has a density of 1.73 pounds per cubic foot. When tested for flame-resistance as previously described, it is non-burning.

EXAMPLE 4

A polyol is prepared following the general procedure and employing quantities of reactants as described in Example 2. In this example, addition of the chloral is completed in about 30 minutes. The reaction mixture is then quickly heated to a temperature of 170° to 171° C. and maintained at this temperature for 4 hours. The liquid polyol product prepared has an hydroxyl number of 465.

A rigid urethane foam is prepared as previously described, employing for each 100 parts of the polyol, 2 parts of L-5310 silicone oil, 24 parts of trichlorofluoromethane and 113 parts of crude diphenylmethane-4,4'-diisocyanate. The foam mass expands to maximum height in 126 seconds. The finished foam has a density of 2.14 pounds per cubic foot and exhibits non-burning characteristics, when tested in accordance with the ASTM flammability test.

Test specimens, 3" x 3" x 1", are cut from the finished foam and are tested for compressive strength in accordance with ASTM D1621-59T (Procedure A), using an Instron Universal Testing Machine, Model TT. The average compressive strength value, parallel to foam rise is 36.9 pounds per square inch; in the direction perpendicular to foam rise, the average compressive strength is 16.2 pounds per square inch.

It is to be understood that although the invention has been described with specific reference to particular embodiments thereof, it is not to be so limited, since changes and alterations therein may be made which are within the full intended scope of this invention as defined into the appended claims.

What is claimed is:

1. A liquid polyol composition which comprises the condensation reaction product produced by reacting, at a temperature of from about 100° to about 225° C., from 1 to 2 mols of a halogenated aldehyde having from 2 to 5 carbons, inclusive, per molecule; 1 mol of at least one branch-chain polyether polyol having a minimum of two hydroxyl groups per molecule; and from 0.08 to 0.10 mol of antimony trioxide.

2. The composition of claim 1 wherein the halogenated aldehyde is chloral.

3. The composition of claim 1 which has an hydroxyl number within the range of 25 to 600.

4. The composition of claim 1 which contains from 2 percent up to 40 percent halogen and from 0.1 percent up to 12 percent antimony, by weight.

5. The composition of claim 2 which contains from 2 percent up to 40 percent chlorine and from 0.1 percent up to 12 percent antimony, by weight.

6. The method for preparing a liquid polyol composition which comprises reacting, at a temperature ranging from 100° to 225° C. for a time period of 1 to 20 hours, from 1 to 2 mols of a halogenated aldehyde having from 2 to 5 carbon atoms, inclusive, per molecule; 1 mol of at least one branch-chain polyether polyol having a minimum of two hydroxyl groups per molecule; and from 0.08 to 0.10 mol of antimony trioxide, the said antimony compound being suspended uniformly in the reaction mixture with agitation; continuing the reaction until the said antimony compound is converted into antimonites of aldehyde hemiacetals of the said branch-chain polyether polyol, which antimonites are soluble in the reaction mixture; and thereafter recovering the liquid halogen and antimony-containing polyol.

7. The method of claim 6 in which the halogenated aldehyde is chloral.

8. The method of claim 6 in which the branch chain polyether polyol is the reaction product of an alkylene oxide having from 2 to 4 carbons with a polyhydric compound having at least three functional hydroxyl groups per molecule.

9. The method of claim 8 in which the branch-chain polyether polyol is the reaction product of propylene oxide and sorbitol.

References Cited

UNITED STATES PATENTS 3,137,661   6/1964   Rose et al.

PATRICK P. GARVIN, *Primary Examiner.*

U.S. Cl. X.R.

252—8.1, 431; 260—2.5, 67